United States Patent
Puchovsky

[19]
[11] Patent Number: 6,032,560
[45] Date of Patent: Mar. 7, 2000

[54] HIGH SPEED TRIMMING SHEAR

[75] Inventor: Melicher Puchovsky, Dudley, Mass.

[73] Assignee: Morgan Construction Company, Worcester, Mass.

[21] Appl. No.: 08/957,343

[22] Filed: Oct. 24, 1997

[51] Int. Cl.[7] .................................................. B26D 1/56
[52] U.S. Cl. ............................... 83/304; 83/305; 83/343; 83/345; 83/344; 83/503; 83/506; 83/508.2
[58] Field of Search .............. 83/304, 305, 343, 83/345, 288, 324, 344, 503, 506, 508.2

[56] References Cited

U.S. PATENT DOCUMENTS

| | | |
|---|---|---|
| 1,948,139 | 2/1934 | Smitmans . |
| 2,451,948 | 10/1948 | Hawthorne . |
| 3,057,239 | 10/1962 | Teplitz . |
| 3,561,311 | 2/1971 | Nowak et al. . |
| 3,643,537 | 2/1972 | Fries ............................................ 83/305 |
| 3,691,810 | 9/1972 | Tadeusz ..................................... 72/242 |
| 3,868,879 | 3/1975 | Takakura et al. . |
| 4,027,564 | 6/1977 | Yahara ....................................... 83/328 |
| 4,027,565 | 6/1977 | Elsner et al. . |
| 4,058,041 | 11/1977 | Ito . |
| 4,094,219 | 6/1978 | Fabian et al. .............................. 83/345 |
| 4,162,642 | 7/1979 | Greven ....................................... 83/328 |
| 4,202,229 | 5/1980 | Feldkamper ............................... 83/304 |
| 4,226,149 | 10/1980 | Feldkamper et al. ...................... 83/305 |
| 4,470,331 | 9/1984 | Eiting et al. ............................... 83/333 |
| 4,640,164 | 2/1987 | Pavlov . |
| 4,656,905 | 4/1987 | Ginzburg et al. ......................... 83/337 |
| 4,962,684 | 10/1990 | Mowry ...................................... 83/332 |
| 5,207,138 | 5/1993 | Sato et al. . |
| 5,216,962 | 6/1993 | Parigi et al. ............................... 83/344 |

*Primary Examiner*—Lee Young
*Assistant Examiner*—Kevin G. Vereene
*Attorney, Agent, or Firm*—Samuels, Gauthier & Stevens

[57] ABSTRACT

A high speed rod trimming shear includes a pair of eccentrically bored sleeves mounted for rotation about parallel first axes. Carrier shafts are supported in the bores of the eccentric sleeves for rotation about second axes parallel to the first axes and located on opposite sides of the rod path. The carrier shafts have blade holders with attached cutting blades. A primary drive rotates the carrier shafts continuously, and an adjustment mechanism rotatably oscillates the eccentric sleeves to adjust the distance between the carrier shafts between a first setting at which the cutting blades rotate out of contact with the rod, and a second setting at which the cutting blades coact during rotation to sever the product.

9 Claims, 3 Drawing Sheets

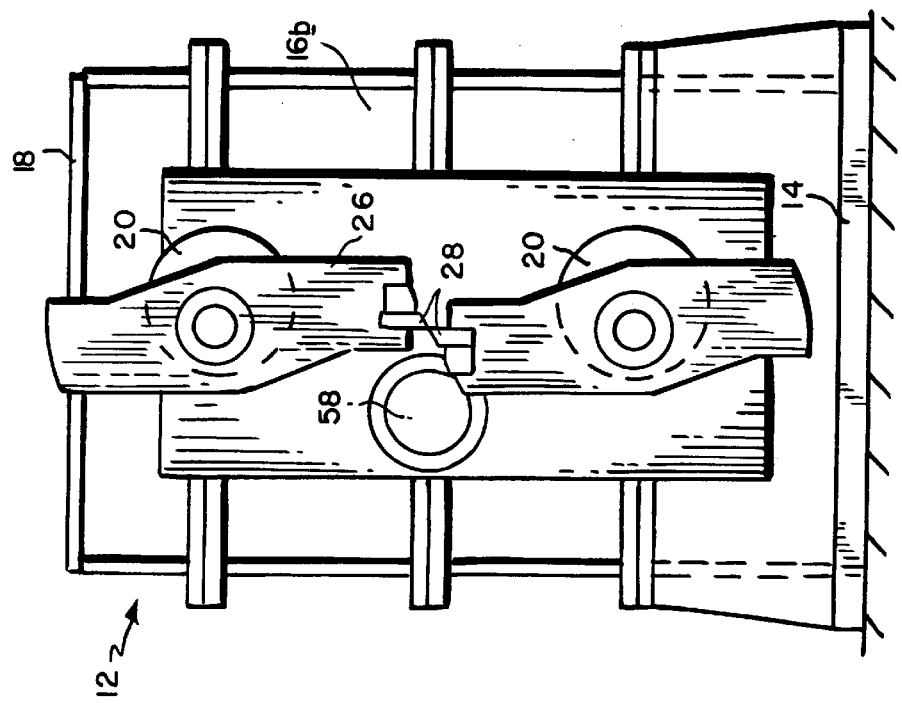
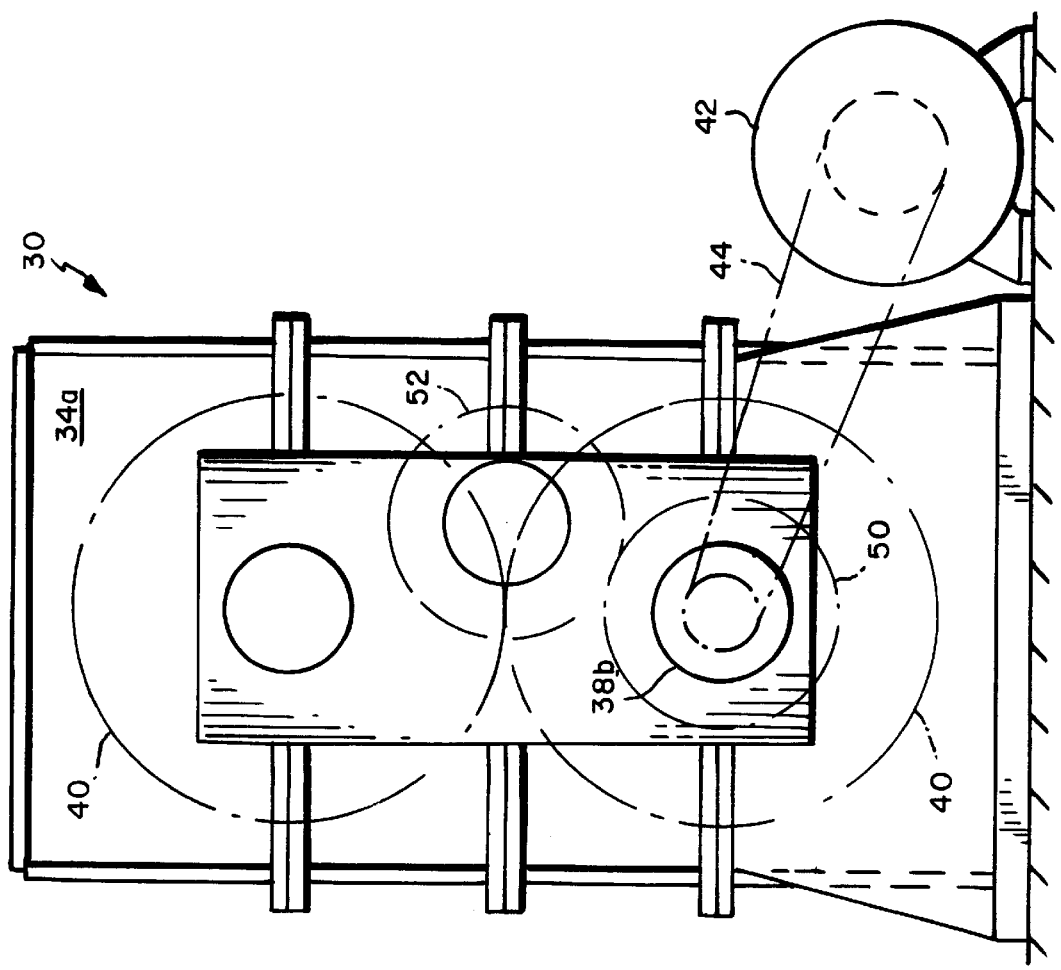

HIGH SPEED TRIMMING SHEAR

BACKGROUND OF THE INVENTION

1. Field of the Invention

This invention relates to high speed shears of the type employed to trim the front and tail ends of hot rolled steel rods and other like products moving at speeds exceeding 100 m/sec.

2. Description of the Prior Art

In order to reliably trim both the front and tail ends of rods traveling at the high delivery speeds of modem rolling mills, which are now reaching 120 m/sec., the shear blades must rotate continuously at speeds synchronized with mill delivery speeds, and they must be arranged for precise coordinated movement into and out of cutting positions during extremely brief time intervals of less than about 6 milliseconds. The shears of the prior art have various shortcomings which inhibit their ability to meet these challenges.

For example, as disclosed in U.S. Pat. No. 2,451,948 (Hawthorne); U.S. Pat. No. 3,057,239 (Teplitz); U.S. Pat. No. 4,027,565 (Elsner et al.); and U.S. Pat. No. 4,640,164 (Pavlov), various schemes have been developed to effect radial adjustment of the cutting blades with respect to rotatable blade holders. These arrangements are mechanically complex, difficult to coordinate and control precisely, and are thus not suitable for very high speed operations of the type contemplated by the present invention.

Other known shears, as disclosed for example by U.S. Pat. No. 3,561,311 (Nowak); U.S. Pat. No. 4,058,041 (Ito); U.S. Pat. No. 4,656,905 (Ginzburg et al.); and U.S. Pat. No. 5,027,138 (Sato et al.) shift one or both of the rotating blade holders, either radially or axially, into and out of cutting positions. Although these arrangements avoid the complexities associated with radial blade adjustments, the inertias inherent in their adjustment mechanisms inhibit their ability to respond with sufficient rapidity.

The objective of the present invention is to provide an improved shear which is free of the disadvantages of the prior art, and capable of operating at the high delivery speeds of modern rod mills.

SUMMARY OF THE INVENTION

In accordance with the present invention, a pair of eccentrically bored sleeves are mounted for rotation about parallel first axes. Carrier shafts are supported in the bores of the eccentric sleeves for rotation about second axes parallel to the first axes and located on opposite sides of the rod path. The carrier shafts have blade holders with attached cutting blades. A primary drive rotates the carrier shafts continuously, and an adjustment mechanism rotatably oscillates the eccentric sleeves to adjust the distance between the carrier shafts between a first setting at which the cutting blades rotate out of contact with the rod, and a second setting at which the cutting blades coact during rotation to sever the product.

BRIEF DESCRIPTION OF THE DRAWINGS

FIG. 2 is an end view looking from right to left in FIG. 1;

FIG. 3 is and end view looking from left to right in FIG. 1;

DESCRIPTION OF PREFERRED EMBODIMENT

Figure 1:
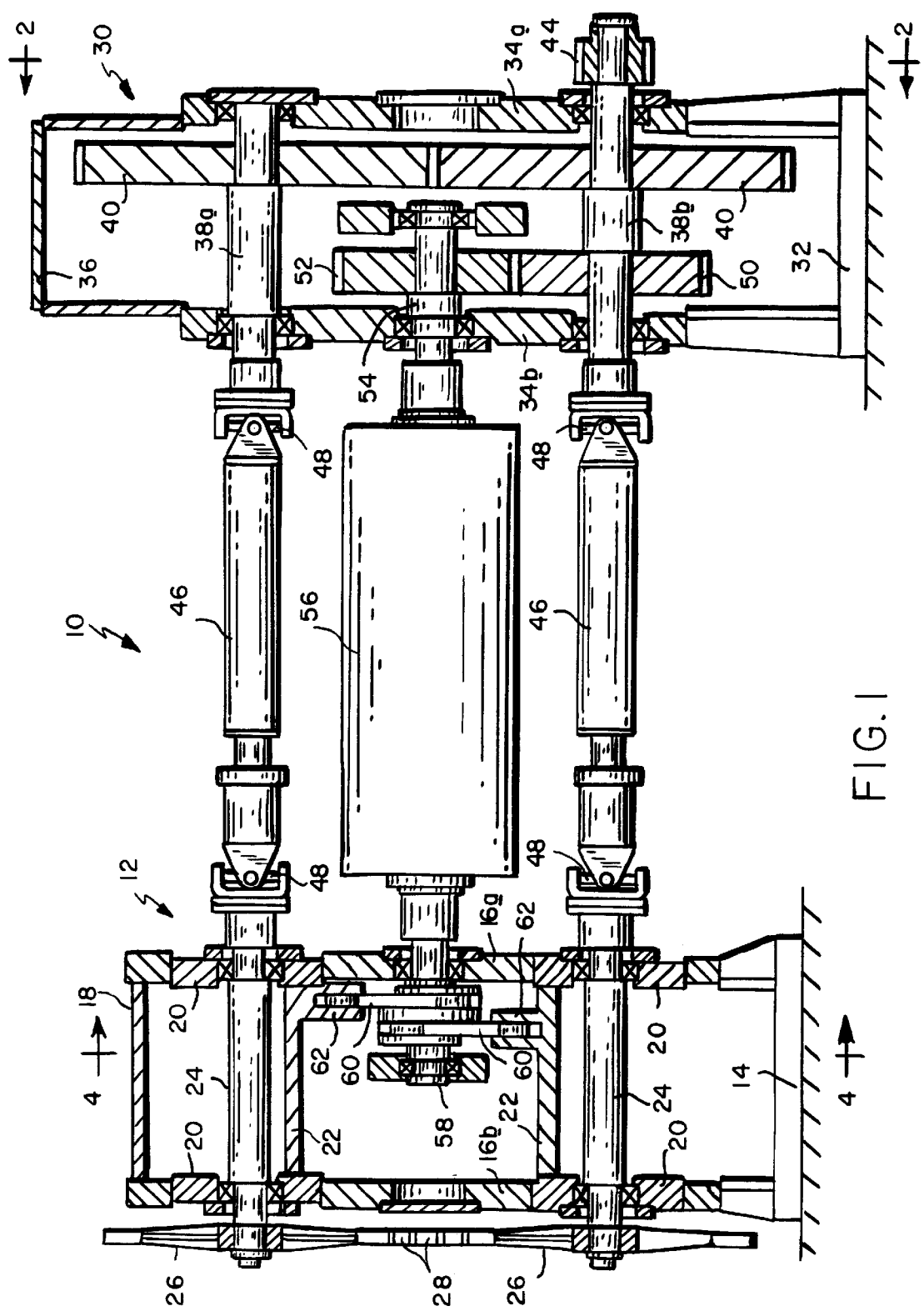
FIG. 1 is a longitudinal sectional view through a shear in accordance with the present invention.

With reference to the drawings, a shear in accordance with the present invention is generally depicted at 10. A first housing 12 includes a base 14, end plates 16a, 16b and a cover 18. Axially aligned pairs of eccentrically bored sleeves 20 are supported in the housing end plates 16a, 16b for rotation about parallel first axes. The sleeves 20 of each pair are joined by yokes 22. Carrier shafts 24 are supported in the bores of the sleeves 20 for rotation about second axes parallel to the rotational sleeve axes. The carrier shafts have blade holders 26 with cutting blades 28 mounted thereon.

A second housing 30 also includes a base 32, end plates 34a, 34b and a cover 36. Drive shafts 38a, 38b are supported in the housing 30 between the end plates 34a, 34b for rotation about fixed parallel axes. The drive shafts 38a, 38b carry intermeshed gears 40, with the lower drive shaft 38b being driven by a motor 42 via a pulley 44 or the like. The drive shafts 38a, 38b are connected to the carrier shafts 24 by means of spindles 46 and couplings 48. Lower drive shaft 38b is additionally provided with a gear 50 meshing with a gear 52 on a stub shaft 54. Shaft 54 is in turn coupled via a clutch/brake unit 56 to a crank shaft 58 supported for rotation about a fixed axis in housing 12. The clutch/brake unit 56 may be of any known type, for example that supplied by Force Control Industries, Inc. of Fairfield, Ohio, USA.

Crank shaft 58 is connected via rods 60 to bifurcated arms 62 extending radially from the yokes 22 connecting the eccentrically bored sleeves 20.

Motor 42 operates to rotate the drive shafts 38a, 38b continuously. Continuous rotation is thus imparted to the carrier shafts 24 via the spindles 46 and couplings 48. Speeds are selected to insure that the cutting blades 28 mounted on the blade holders 26 rotate at speeds matching that of the product to be severed.

Gear 52 is also continuously rotated, but this continuous rotation is only intermittently transmitted to crank shaft 58 by the clutch and brake assembly 56.

Figure 5B:
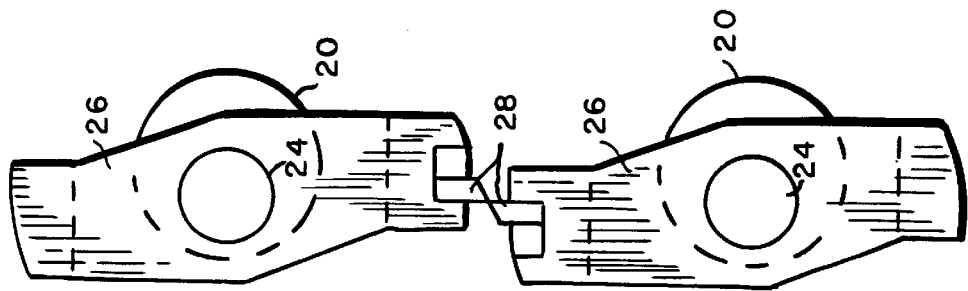
FIGS. 5A and 5B are diagrammatic illustrations showing "open" and "cut" blade adjustments.
Figure 5A:
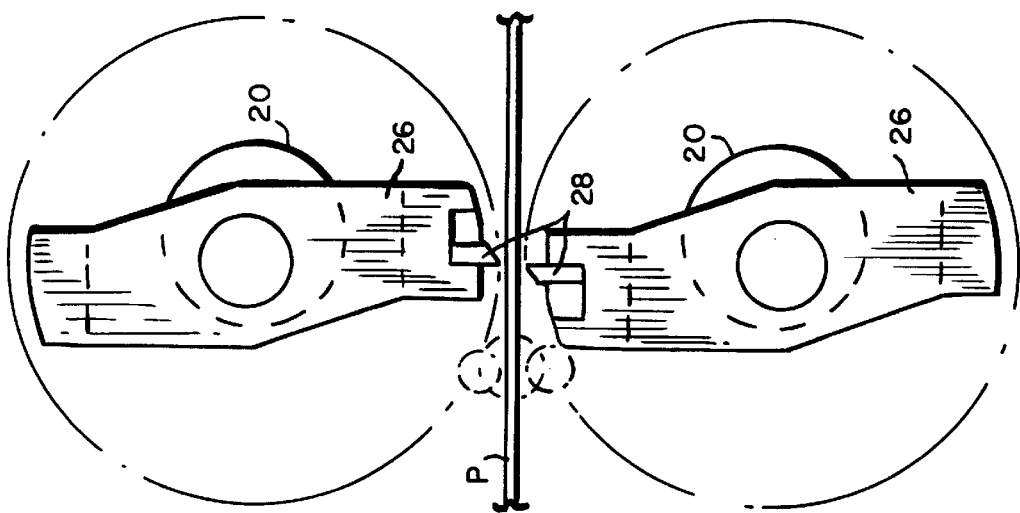
Figure 4:
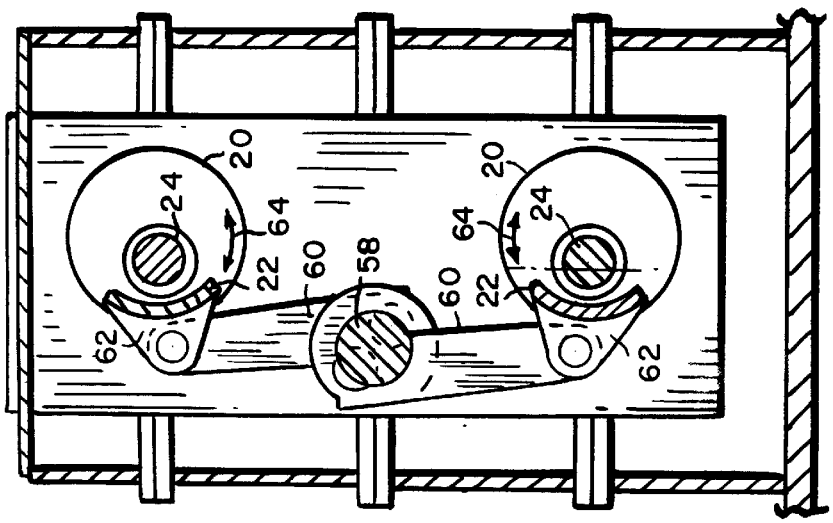
FIG. 4 is a sectional view taken along line 4—4 of FIG. 1.

This occurs on demand and at selected intervals when the unit 56 is operated to rotate the crank shaft 58 through one revolution, causing the eccentrically bored sleeves 20 to rotatably oscillate as indicated by the arrows 64 in FIG. 4. This oscillation will in turn displace the rotational axes of the carrier shafts 24 between an "open" position, as shown in FIG. 5A, where the paths of blade rotation are spaced laterally from the product "P" passing therebetween, and a "cut" position, as shown in FIG. 5B, where the paths of blade rotation coact to cut the product. Rotation of the crank shaft 58 through one revolution takes place on demand, during a time interval of less than about 25 miliseconds.

In light of the foregoing, it will be appreciated by those skilled in the art that the present invention offers a number of significant advantages not to be found in prior art shears. More particularly, the cutting blades 28 are driven continuously at the high speeds required to effect efficient cuts, and are moved into and out of their cutting positions, on demand, by a simple yet extremely responsive adjustment mechanism. The blade adjustment mechanism is characterized by low inertia, requiring only minimum oscillating rotation of the eccentrically bored sleeves 20.

I claim:

1. A shear for cutting a rolled product such as a rod moving linearly along a path, said shear comprising:

eccentrically bored sleeves;

means for supporting said sleeves for rotation about fixed parallel first axes;

carrier shafts supported in the bores of said sleeves for rotation about second axes parallel to said first axes;

a pair of cutting blades;

means for mounting said cutting blades on said carrier shafts for rotation therewith on opposite sides of said path;

primary drive means for continuously rotating said carrier shafts; and adjustment means for rotatably oscillating said eccentric sleeves, said adjustment means comprising a crank shaft mounted for rotation about an axis parallel to the axes of rotation of said sleeves, link members connecting said crank shaft to said sleeves, and secondary drive means for intermittently rotating said crank shaft, said adjustment means being operable to alter the distance between said carrier shafts between a first setting at which said cutting blades rotate out of contact with said product, and a second setting at which said cutting blades coact during rotation to sever said product.

2. The shear as claimed in claim 1 wherein said primary drive means comprises a pair of drive shafts, means for supporting said drive shafts for rotation about fixed axes, gear means for mechanically interconnecting said drive shafts, universal coupling means for connecting each drive shaft to one of said carrier shafts, and means for rotatably driving one of said drive shafts.

3. The shear as claimed in claim 1 wherein said secondary drive means comprises an intermediate shaft arranged coaxially with said crank shaft, second gear means for mechanically interconnecting said intermediate shaft to one of said drive shafts, and a clutch/brake unit coupling said intermediate shaft to said crank shaft.

4. The shear as claimed in claim 1 wherein said sleeves and said crank shaft are rotatably supported in a common housing.

5. The shear as claimed in claim 4 wherein said crank shaft is located in a plane extending between said sleeves.

6. The shear as claimed in claim 2 wherein said universal coupling means comprises connecting shafts extending between and coupled at opposite ends respectively to said carrier shafts and said drive shafts by universal couplings.

7. A shear for cutting a product moving linearly along a path, said shear comprising:

a pair of eccentrically bored sleeves;

housing means for supporting said sleeves for rotation about fixed parallel first axes;

a pair of carrier shafts, each carrier shaft being supported in the bore of a respective one of said sleeves for rotation about a second axis parallel to said first axes;

a pair of cutting blades;

means for mounting said cutting blades on said carrier shafts for rotation therewith on opposite sides of said path;

primary drive means for continuously rotating said carrier shafts; and adjustment means for rotatably adjusting said eccentric sleeves, said adjustment means comprising a crank shaft mounted for rotation about an axis parallel to the axes of rotation of said sleeves, link members connecting said crank shaft to said sleeves, and secondary drive means for intermittently rotating said crank shaft, said adjustment means being operable to alter the distance between said carrier shafts between a first setting at which said cutting blades rotate out of contact with said product, and a second setting at which said cutting blades coact during rotation to sever said product.

8. A shear for cutting a rolled product such as a rod moving linearly along a path, said shear comprising:

a pair of eccentrically bored sleeves;

housing means for supporting said sleeves for rotation about fixed parallel axes;

carrier shafts supported in the bores of said sleeves for rotation about second axes parallel to said first axes;

a pair of cutting blades;

means for mounting said cutting blades on said carrier shafts for rotation therewith on opposite sides of said path;

primary drive means for continuously rotating said carrier shafts;

a crank shaft mounted for rotation about a third axis parallel to said first and second axes;

link members connecting said crank shaft to said sleeves; and secondary drive means for intermittently rotating said crank shaft, with the rotary motion of said crank shaft being transmitted via said link members to said sleeves, causing said sleeves to rotatably oscillate and thereby alter the distance between said carrier shafts between a first setting at which said cutting blades rotate out of contact with said product, and a second setting at which said cutting blades coact during rotation to sever said product.

9. A shear for cutting a rolled product such as a rod moving linearly along a path, said shear comprising:

eccentrically bored sleeves;

means for supporting said sleeves for rotation about fixed parallel axes;

carrier shafts supported in the bores of said sleeves for rotation about second axes parallel to said first axes;

a pair of cutting blades;

means for mounting said cutting blades on said carrier shafts for rotation therewith on opposite sides of said path;

primary drive means for continuously rotating said carrier shafts, said primary drive means including a pair of mechanically coupled continuously driven drive shafts mounted for rotation about fixed axes, with connecting shafts extending between and coupled at opposite ends respectively to said carrier shafts and said drive shafts by universal couplings; and adjustment means for rotatably oscillating said eccentric sleeves, said adjustment means comprising a crank shaft mounted for rotation about an axis parallel to the axes of rotation of said sleeves, link members connecting said crank shaft to said sleeves, and secondary drive means for intermittently rotating said crank shaft, said adjustment means being operable to alter the distance between said carrier shafts between a first setting at which said cutting blades rotate out of contact with said product, and a second setting at which said cutting blades coact during rotation to sever said product.

* * * * *